United States Patent [15] 3,651,284
Maione [45] Mar. 21, 1972

[54] EXTENDING THE CAPABILITY OF A FAULT LOCATE LINE

[72] Inventor: Theodore Lincoln Maione, Little Silver, N.J.

[73] Assignee: Bell Telephone Laboratories, Incorporated, Berkeley Heights, N.J.

[22] Filed: Nov. 10, 1970

[21] Appl. No.: 88,297

[52] U.S. Cl. ....................179/175.31R
[51] Int. Cl. ....................H04b 1/60
[58] Field of Search ....................179/175.31 R

[56] References Cited

UNITED STATES PATENTS 2,315,434 3/1943 Leibe ....................179/175.31 R

*Primary Examiner*—Kathleen H. Claffy
*Assistant Examiner*—Douglas W. Olms
*Attorney*—R. J. Guenther and E. W. Adams, Jr.

[57] ABSTRACT

The capability of a fault locate line in a transmission system is extended through selective powering of fault locate amplifiers by polarity reversal of the line power. A standard test procedure can be duplicated to evaluate the operation of unattended repeater stations associated with fault locate amplifiers in each section of the fault locate line as a separate group by simply reversing the powering polarity.

5 Claims, 5 Drawing Figures

INVENTOR
T. L. MAIONE
BY David P. Kelley
ATTORNEY

EXTENDING THE CAPABILITY OF A FAULT LOCATE LINE

BACKGROUND OF THE INVENTION

This invention relates to communication systems using unattended repeater stations and, more particularly, to extending the capability of a fault locate line in such a communication transmission system.

Prior art cable transmissions systems which have a plurality of insulated conductors that are paired usually employ repeater stations to amplify the communication signals at different locations along the transmission path as the signals are attenuated by transmission through the cable. Generally, most of these repeater stations are unattended and powered through the transmission line from attended repeater stations or intermediate powering stations. Various methods have been devised by those skilled in the art to evaluate the operation of the unattended repeater stations from the attended repeater stations to maintain operation of the communication system in spans of unattended transmission lines. For example, a test generator may be located at the attended repeater stations. Each of the unattended repeater stations may have a frequency-selective filter which corresponds to a particular frequency sent out by the test generator. Detecting equipment may also be used to evaluate the returning test return signal which returns on a selected pair of conductors in the transmission cable known as a fault locate line. Thus, each unattended station is interrogated from the attended station by proper frequency selection, and its condition ascertained from the monitored return signal.

Present-day requirements indicate a trend toward increasing the volume of information to be transmitted by cable transmission systems. Advances in the technology of cables and repeater stations enable an increase in the number of unattended repeaters between attended stations. and a higher frequency bandpass characteristic of the system. Thus, a larger volume of information pulses or signals may be transmitted within a given time period over greater distances. Since the number of the frequency-selective filters is limited by both the frequency bandwidth of the fault locate line and the frequency separation between practically designed frequency filters connected to the various unattended repeater stations in the cable transmission system, another arrangement must be devised to accommodate the increased number of unattended repeater stations connected to the fault locate line so as to avoid narrow frequency spacing and costly filters which may yield marginal results. An alternative arrangement would be to use another pair of conductor- in the fault locate system to enable testing the increased number of attended repeater stations. Unfortunately, such an arrangement would reduce the number of conductors available to transmit information and correspondingly decrease the overall transmission capacity of the cable.

SUMMARY OF THE INVENTION

In an illustrative embodiment of the present invention, a fault locate line is separated into two sections by a crossover point which reverses the respective polarities of the two conductors of the fault locate line between the two sections. A group of fault locate amplifiers is connected to each section of the fault locate line. Each fault locate amplifier is associated with an unattended repeater location serially spaced along a transmission system. A diode arrangement powers and connects the fault locate amplifiers to the fault locate line in response to only one of the two possible polarities on the fault locate line.

A span of the unattended repeater stations may run between two attended repeater stations, in most cases, or terminate into a terminal office. The test equipment at the attended repeater stations which may also function as terminal offices comprises a test signal generator and a detector to evaluate the returning test signals. The test signal generators are generally capable of producing different frequencies necessary to pass through each of the different frequency-selective filters connected to each unattended repeater station. At the attended repeater stations, a power source is also coupled to the fault locate line through a polarity reversal switch. For each of the given polarities of the polarity reversal switch, the appropriate section of the fault locate line will have the correct polarity to activate and connect a group of fault locate amplifiers to the fault locate line located in that section. The fault locate amplifiers in the other section have their polarity reversed so that they remain inoperative and disconnected from the fault locate line. In this manner, a complete series of evaluation tests of the unattended repeater stations may be duplicated with the same sequence of identical test frequencies for each section of the fault locate line.

In a modified illustrative embodiment of the present invention, a fault locate line repeater is used to repower the fault locate line with the appropriate polarity and to amplify the fault locate signal returning to the appropriate attended repeater station. The fault locate line repeater has sensing relays which are controlled by the line power on the fault locate line from either side of the fault locate line and which are eventually connected to the attended repeater stations located at the ends of the unattended repeater span. The side of the fault locate line from which the power comes into the fault locate line repeater determines which one of the two attended repeater stations is conducting a repeater fault locate test. Accordingly, one of two amplifiers is connected to the line to amplify the returning fault locate signal to the attended repeater station performing the test.

A feature of the present invention is a crossover point dividing a fault locate line into two sections that have opposite power polarity.

Another feature of the present invention is a diode arrangement which completes the series circuit of the output connection of the fault locate amplifiers to the fault locate line upon polarity reversal of the power.

A further feature of the present invention is the use of sensing relays which are connected to the fault locate line to control the repowering and amplification capabilities of a fault locate line repeater required to increase the range of a repeater interrogation utilizing the fault locate line.

These and other features of the present invention will become apparent upon reading the detailed description taken in conjunction with he accompanying drawings.

DETAILED DESCRIPTION

BACKGROUND OF THE INVENTION

Figure 1A:
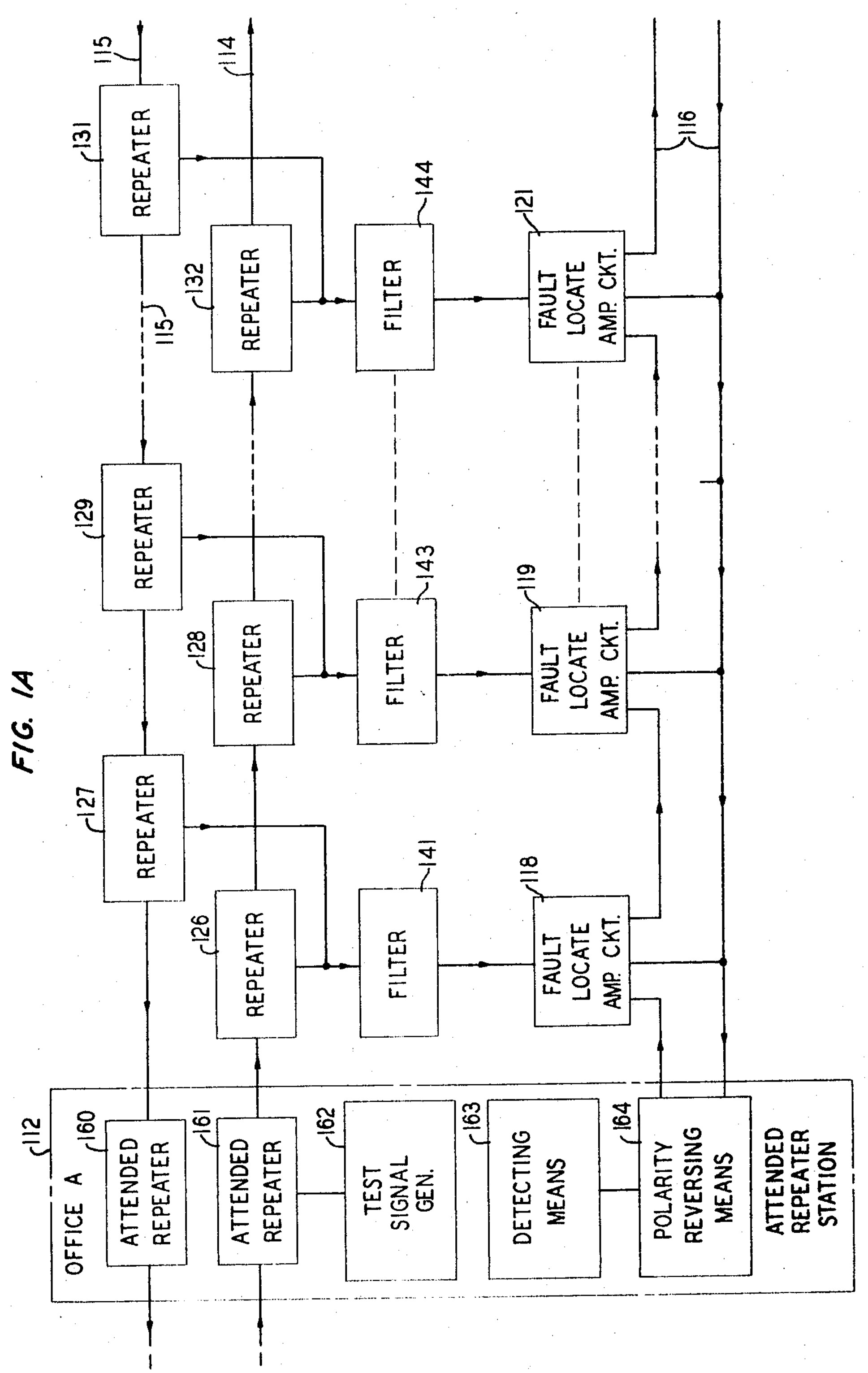
FIGS. 1A and 1B are illustrative embodiments in block diagram of the invention in a communication system.

This invention relates to communication systems using unattended repeater stations and, more particularly, to extending the capability of a fault locate line in such a communication transmission system.

Prior art cable transmission systems which have a plurality of insulated conductors that are paired usually employ repeater stations to amplify the communication signals at different locations along the transmission path as the signals are attenuated by transmission through the cable. Generally, most of these repeater stations are unattended and powered through the transmission line from attended repeater stations or intermediate powering stations. Various methods have been devised by those skilled in the art to evaluate the operation of the unattended repeater stations from the attended repeater stations to maintain operation of the communication system in spans of unattended transmission lines. For example, a test generator may be located at the attended repeater stations. Each of the unattended repeater stations may have a frequency-selective filter which corresponds to a particular frequency sent out by the test generator. Detecting equipment may also be used to evaluate the returning test return signal which returns on a selected pair of conductors in the transmission cable known as a fault locate line. Thus, each unattended station is interrogated from the attended station by proper frequency selection, and its condition ascertained from the monitored return signal.

Present-day requirements indicate a trend toward increasing the volume of information to be transmitted by cable transmission systems. Advances in the technology of cables and repeater stations enable an increase in the number of unattended repeaters between attended stations and a higher frequency bandpass characteristic of the system. Thus, a larger volume of information pulses or signals may be transmitted within a given time period over greater distances. Since the number of the frequency-selective filters is limited by both the frequency bandwidth of the fault locate line and the frequency separation between practically designed frequency filters connected to the various unattended repeater stations in the cable transmission system, another arrangement must be devised to accommodate the increased number of unattended repeater stations connected to the fault locate line so as to avoid narrow frequency spacing and costly filters which may yield marginal results. An alternative arrangement would be to use another pair of conductors in the fault locate system to enable testing the increased number of attended repeater stations. Unfortunately, such an arrangement would reduce the number of conductors available to transmit information and correspondingly decrease the overall transmission capacity of the cable.

SUMMARY OF THE INVENTION

In an illustrative embodiment of the present invention, a fault locate line is separated into two sections by a crossover point which reverses the respective polarities of the two conductors of the fault locate line between the two sections. A group of fault locate amplifiers is connected to each section of the fault locate line. Each fault locate amplifier is associated with an unattended repeater location serially spaced along a transmission system. A diode arrangement powers and connects the fault locate amplifiers to the fault locate line in response to only one of the two possible polarities on the fault locate line.

A span of the unattended repeater stations may run between two attended repeater stations, in most cases, or terminate into a terminal office. The test equipment at the attended repeater stations which may also function as terminal offices comprises a test signal generator and a detector to evaluate the returning test signals. The test signal generators are generally capable of producing different frequencies necessary to pass through each of the different frequency-selective filters connected to each unattended repeater station. At the attended repeater stations, a power source is also coupled to the fault locate line through a polarity reversal switch. For each of the given polarities of the polarity reversal switch, the appropriate section of the fault locate line will have the correct polarity to activate and connect a group of fault locate amplifiers to the fault locate line located in that section. The fault locate amplifiers in the other section have their polarity reversed so that they remain inoperative and disconnected from the fault locate line. In this manner, a complete series of evaluation tests of the unattended repeater stations may be duplicated with the same sequence of identical test frequencies for each section of the fault locate line.

In a modified illustrative embodiment of the present invention, a fault locate line repeater is used to repower the fault locate line with the appropriate polarity and to amplify the fault locate signal returning to the appropriate attended repeater station. The fault locate line repeater has sensing relays which are controlled by the line power on the fault locate line from either side of the fault locate line and which are eventually connected to the attended repeater stations located at the ends of the unattended repeater span. The side of the fault locate line from which the power comes into the fault locate line repeater determines which one of the two attended repeater stations is conducting a repeater fault locate test. Accordingly, one of two amplifiers is connected to the line to amplify the returning fault locate signal to the attended repeater station performing the test.

A feature of the present invention is a crossover point dividing a fault locate line into two sections that have opposite power polarity.

Another feature of the present invention is a diode arrangement which completes the series circuit of the output connection of the fault locate amplifiers to the fault locate line upon polarity reversal of the power.

A further feature of the present invention is the use of sensing relays which are connected to the fault locate line to control the repowering and amplification capabilities of a fault locate line repeater required to increase the range of a repeater interrogation utilizing the fault locate line.

These and other features of the present invention will become apparent upon reading the detailed description taken in conjunction with the accompanying drawings.

BRIEF DESCRIPTION OF THE DRAWINGS

Figure 1B:
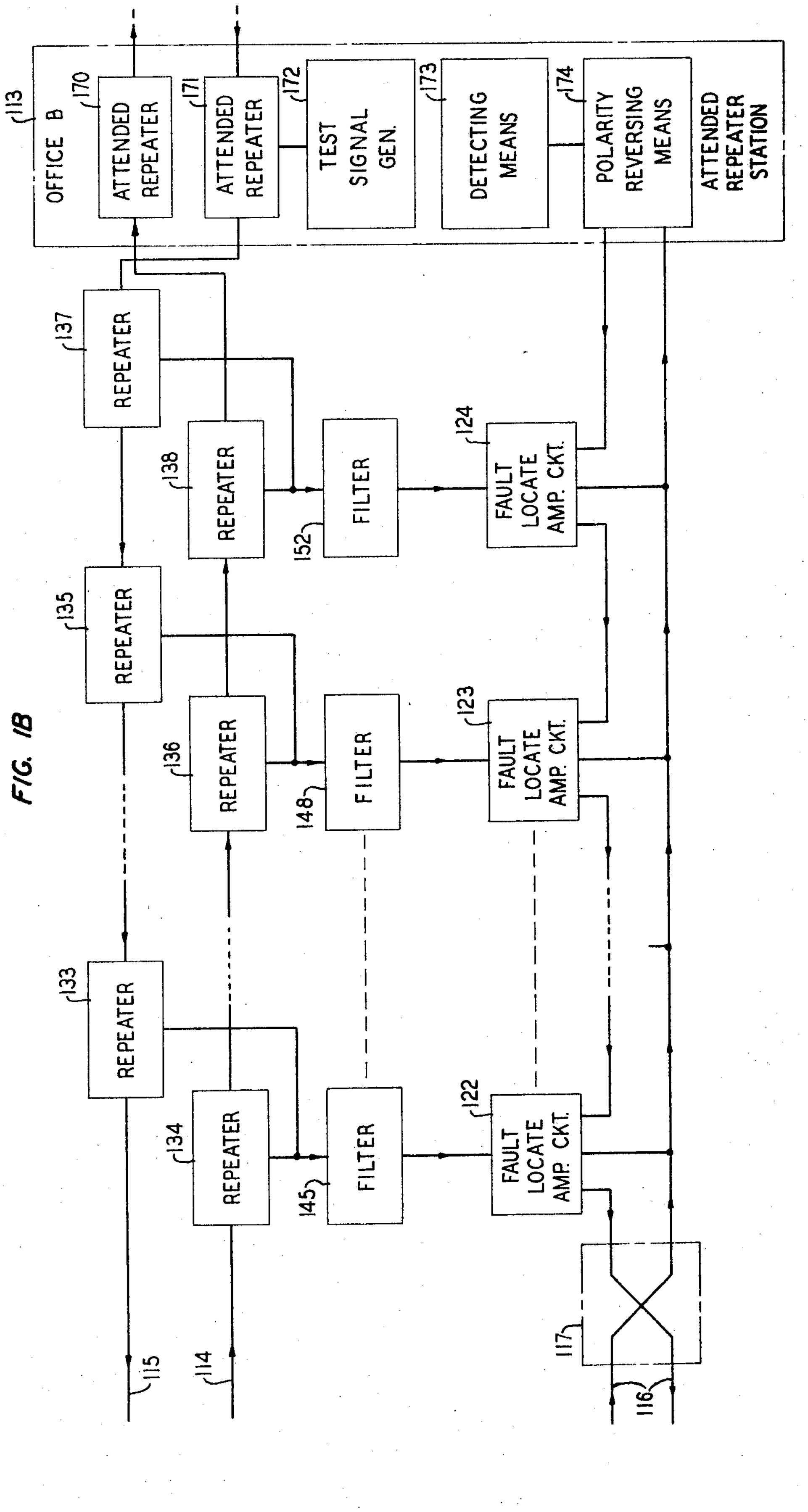
Figure 4:
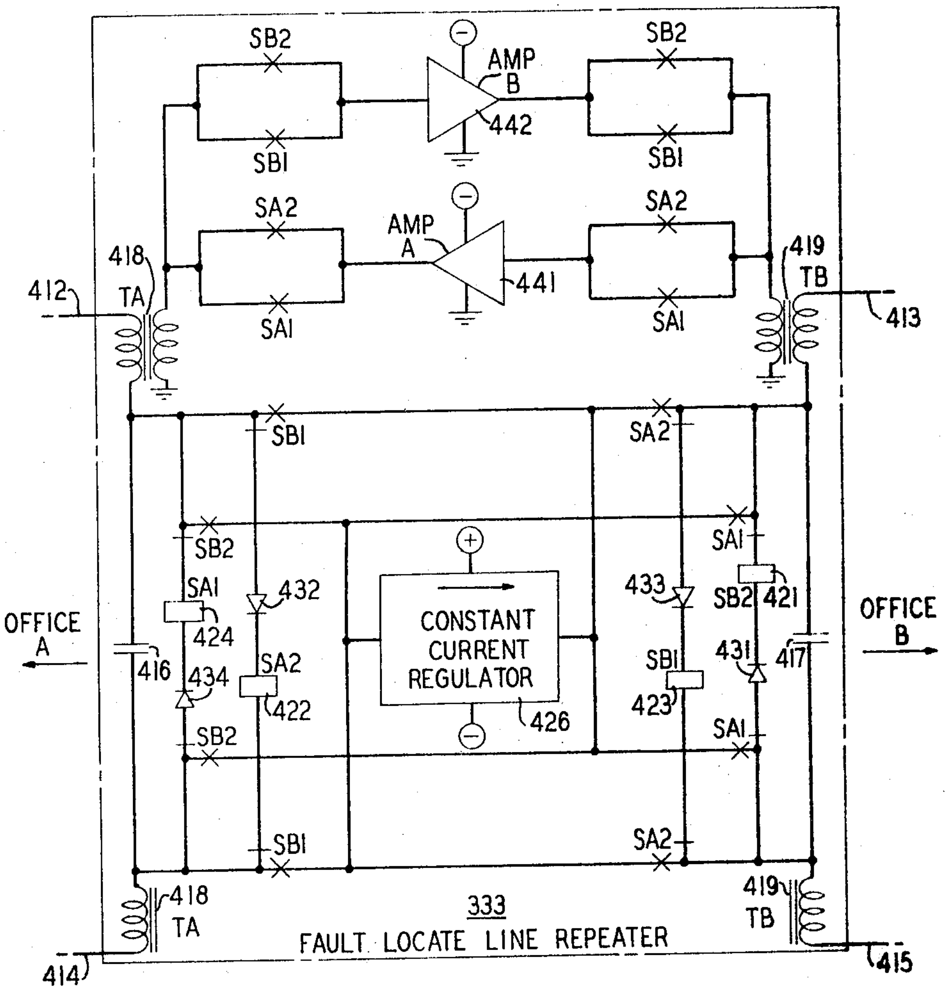
FIG. 4 is a diagram of an illustrative embodiment of a fault locate line repeater used in the modified embodiment of FIG. 3.
Figure 2:
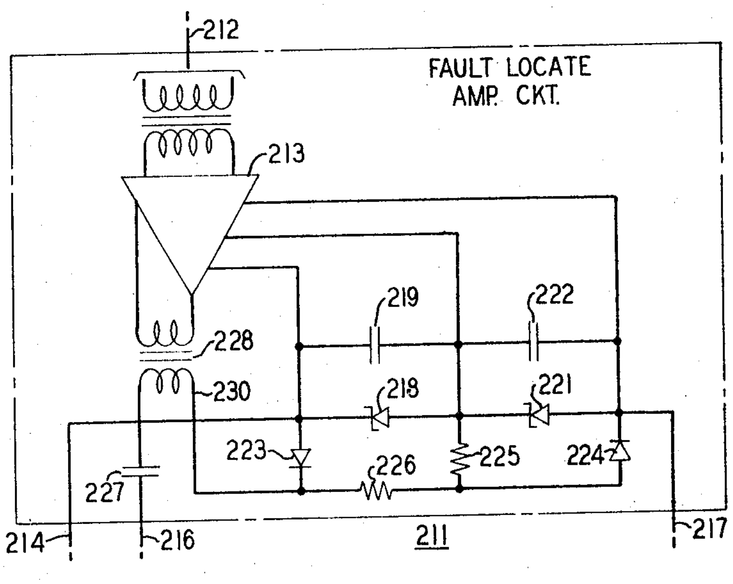
FIG. 2 is a schematic view of an illustrative embodiment of a fault locate amplifier circuit used in the fault locate system in FIG. 1.
Figure 3:
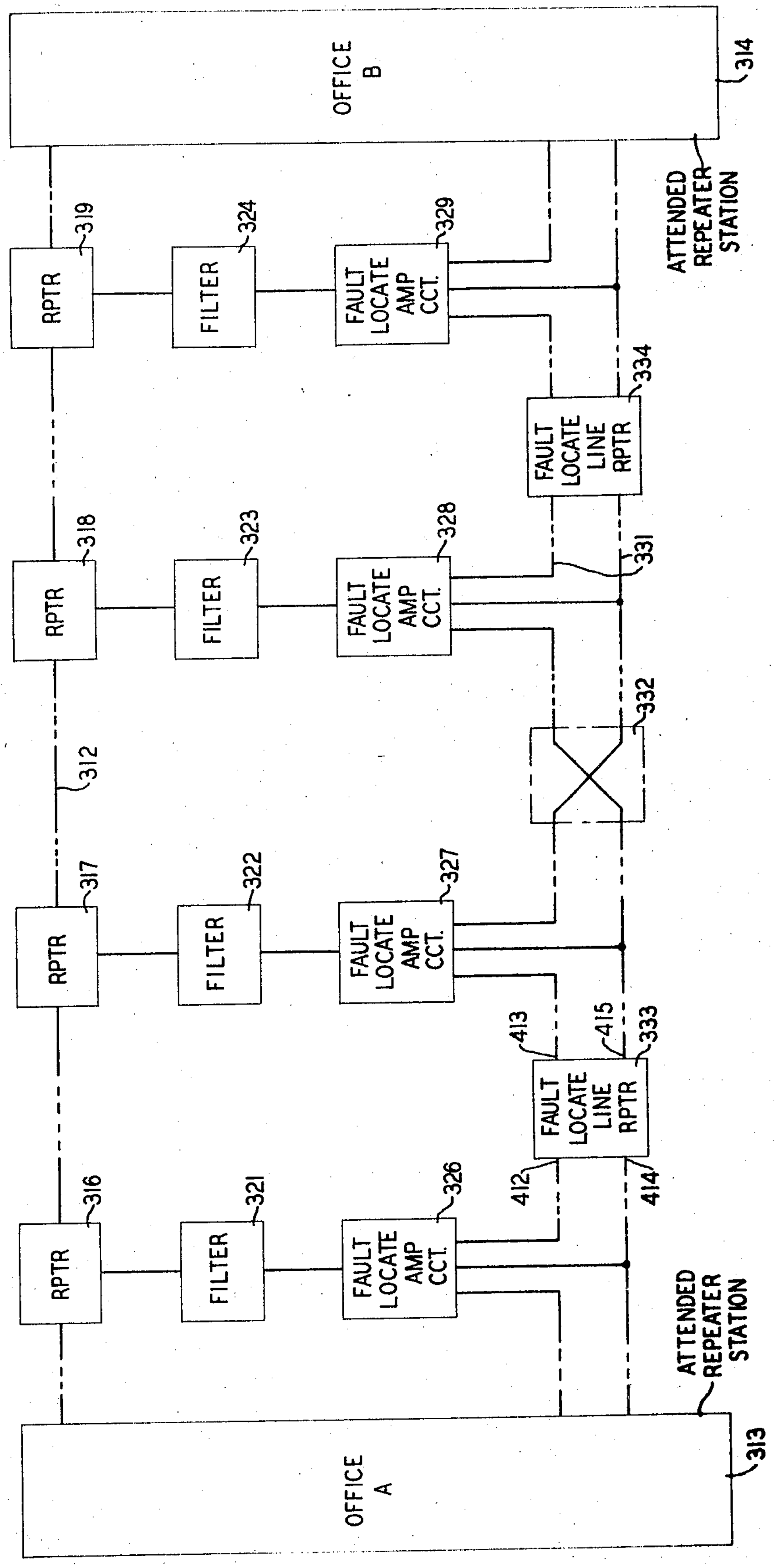
FIG. 3 is a block diagram of a modified illustrative embodiment of the invention shown in a simplified version of a communication system.

FIGS. 1A and 1B are illustrative embodiments in block diagram of the invention in a communication system;

FIG. 2 is a schematic view of an illustrative embodiment of a fault locate amplifier circuit used in the fault locate system in FIG. 1;

FIG. 3 is a block diagram of a modified illustrative embodiment of the invention shown in a simplified version of a communication system; and FIG. 4 is a diagram of an illustrative embodiment of a fault locate line repeater used in the modified embodiment of FIG. 3.

DETAILED DESCRIPTION

Referring to FIGS. 1A and 1B, a typical portion of a cable transmission system is shown comprising a first attended repeater station 112, a second repeater station 113, an inbound transmission line 114 and an outbound transmission line 115 with respect to the attended repeater station 113, and a common fault locate line 116 separated into two sections by a crossover 117. In the first section, fault locate amplifiers 118, 119 and 121 are connected to the fault locate line 116, and fault locate amplifiers 122, 123 and 124 are connected to the fault locate line 116 in the second section.

In order to simplify an understanding of FIGS. 1A and 1B, the unattended repeater stations will be referred to as repeaters, and the repeaters in the inbound span will be labeled with even numbers while the repeaters in the outbound span will correspondingly be labeled with odd numbers. In actual practice, several more repeaters may be used. The number of repeaters in the drawings of FIGS. 1A and 1B are shown merely to illustrate the invention.

In both transmission lines of FIGS. 1A and 1B, repeaters and respective filters are serially spaced at locations along the respective transmission lines. The locations of the fault locate amplifiers correspond to these locations and are connected to the fault locate line 116. The inbound transmission line 114 comprises repeaters 126, 128, 132, 134, 136 and 138 connected respectively to filters 141, 143, 144, 145, 148 and 152. The outbound transmission line 115 comprises repeaters 127, 129, 131, 133, 135 and 137 connected respectively to filters 141, 143, 144, 145, 148 and 152. Filter 141 is connected to the fault locate amplifier 118; filter 143 is connected to the fault locate amplifier 119; filter 144 is connected to the fault locate amplifier 121; filter 145 is connected to the fault locate amplifier 122; filter 148 is connected to the fault locate amplifier 123; and filter 152 is connected to the fault locate amplifier 124.

The equipment at attended repeater station 112 comprises an attended repeater 160 connected to the outbound transmission line 115 and an attended repeater 161 connected to the inbound transmission line 114, a test signal generator 162 which may be connected to the attended repeater 161, and detecting means 163 connected through polarity reversing means 164 to the fault locate line 116. The detecting means 163 evaluates returning test signals which are generated by the test signal generator 162 at attended repeater station 112 during interrogation of the repeaters located in the inbound transmission line 114. At attended repeater station 113, the equipment comprises an attended repeater 170 connected to the inbound transmission line 114 and attended repeater 171 connected to the outbound transmission line 115, a test signal generator 172 which may be connected to repeater 171, and detecting means 173 connected through polarity reversing means 174 to the fault locate line 116.

FIG. 2 is an illustrative embodiment of a fault locate amplifier circuit 211 comprising input terminals 212 connected to an amplifier 213 and output terminals 214, 216 and 217. Referring to any of the fault locate amplifiers of FIGS. 1A and 1B, the terminals 214 and 217 of FIG. 2 are in series with one of the conductors of the fault locate line 116 while the terminal 216 is connected to the other conductor of the fault locate line. A semiconductor device 218, such as a diode, is shunted by a capacitor 219. Both are in series with another diode 221 shunted by a capacitor 222.

The direction of current flow which may be supplied by polarity reversal means 164 in FIG. 1 causes the terminal 214 to become positive with respect to the terminal 217 of FIG. 2 for the fault locate amplifier circuits in the first section of the fault locate line 116. Thus, the diodes 218 and 221 are reverse-biased to provide a predetermined potential difference which is used as a power supply for the amplifier 213. At the same time, semiconductor diodes 223 and 224 are forward-biased through a resistor network comprising resistors 225 and 226. The diodes 223 and 224 complete the series output signal path which includes a capacitor 227 and an output transformer 228. Reversal of the line power by polarity reversal means 164 changes the direction of current flow. The change of polarity causes the fault locate amplifiers in the first section of the fault locate line 116 to become inoperative and effectively opens the output signal path of fault locate amplifiers. This is the state that the fault locate amplifiers in the second section of the fault locate line were in before the polarity was reversed. With this line polarity, the terminal 217 is positive with respect to the terminal 214 and the diodes 218 and 221 are forward-biased while the diodes 223 and 224 are reverse-biased. The result is that the amplifier 213 is not powered by the forward-biased diodes 218 and 221 and the output terminal 230 of the amplifier 213 is effectively disconnected from the fault locate line 116 by diodes 223 and 224 which are reverse-biased to produce high impedance in the relatively low impedance output signal path.

A more complete understanding of the operation of FIGS. 1A and 1B can now be obtained through a study of the circuitry of FIG. 2. In general, the information in the communication system of FIG. 1 is transmitted in bipolar form, which offers many advantages that are well known in the art of transmission systems. Restrictive coding is also usually employed to maintain a minimum amount of clock energy in the signal to run the clocks in the repeater stations.

In the event of a transmission failure in line 114, the test signal generator 162 is used to transmit test signal pulse patterns that have fundamental frequencies corresponding to the various filter frequencies of the filters located at each of the unattended repeater locations. The appropriate frequency test signal which is indicative of a specific repeater is filtered and then amplified by a fault locate amplifier circuit like that of FIG. 2, which is found at each of the unattended repeater locations. All the filters in each section of the fault locate line are tuned to a different frequency and, by powering the fault locate amplifiers in each section of the fault locate line separately, the filter frequencies can be duplicated in the other section of the fault locate line without causing any deleterious effect upon the test procedure.

The use of a restrictive coding format of the pulse signal information enables several filters to feed a single fault locate amplifier circuit. The test signal pulse patterns are deliberate violations of the coding format. Therefore, a test procedure can be performed on one transmission path while the other transmission paths which are connected to the same fault locate amplifier circuit are operating normally without contributing an erroneous test signal.

FIG. 3 depicts a modified illustrative embodiment of the present invention in a simplified transmission system. The modified embodiment comprises a representative transmission path 312 between attended repeater stations 313 and 314; repeater stations 316, 317, 318 and 319 which are serially spaced along the transmission path 312; filters 321, 322, 323 and 324 which are connected between the repeaters at each location and fault locate amplifiers 326, 327, 328 and 329, respectively. A fault locate line 331 with a crossover point 332 has two representative serially spaced fault locate line repeaters 333 and 334. The fault locate line repeaters 333 and 334 of FIG. 3 enable the fault locate test procedure to be conducted over a much greater span than the fault locate test arrangement of FIG. 1.

FIG. 4 is an illustrative embodiment of the fault locate line repeater 333 which is connected between the terminal pairs, 412 and 414 and 413 and 415, of the fault locate line 331 in FIG. 3. The fault locate line repeater 333 is powered by a suitable independent source not shown in FIG. 4. The fault locate line repeater 333 is able to amplify signals and repower the fault locate line 331 in the direction of the returning test signal and with the appropriate line polarity which is controlled by which one of the two attended repeater stations 313 and 314 is conducting a fault locate test procedure. If attended repeater station 313 is conducting the fault locate test procedure, terminals 412 and 414 will be powered by office A and the returning test signal from points beyond fault locate line repeater 333 will return to terminals 413 and 415. In this case, a DC potential will be impressed across terminals 412 and 414 which are connected to a transformer 418 that has two windings connected by a series capacitor 416. If the terminal 412 is positive with respect to the terminal 414, a DC potential is developed across the capacitor 416 and a DC current will flow through a diode 432 which is connected in series with a solenoid 422 of a relay SA2. The solenoid 422 controls a plurality of contacts, on relay SA2, which are designated as SA2 in FIG. 4. A constant current regulator 426 is connected through a path completed by the SA2 contacts of the relay 422. Therefore, a DC potential is developed across a capacitor 417 which is connected in series with a split winding of a transformer 419. The DC potential is also developed across terminals 413 and 415. Thus, a DC potential across the terminals 412 and 414 will cause the same polarity DC potential across terminals 413 and 415 to repower the fault locate line 331. The returning test signal will be impressed across terminals 413 and 415 and a further pair of SA2 contacts of the relay 422 will connect an amplifier 441 into the circuit between the terminal pairs 413, 415 and 412, 414.

If office A is still conducting a test and the DC polarity is reversed such that terminal 414 is positive with respect to terminal 412, another series path, comprising a diode 434 and the solenoid of a relay 424, is completed. The SA1 contacts of the relay 424 are now activated. The result is that the constant current regulator 426 is connected through an electrical path completed by a pair of SA1 contacts to provide a positive potential on the terminal 415 with respect to the terminal 413. Another pair of SA1 contacts on the relay 424 connects the amplifier 441 so that the returning test signal across terminals 413 and 415 is amplified and impressed across terminals 412 and 414.

If, on the other hand, office B is conducting a fault locate test procedure, a DC polarity is developed across terminals 413 and 415 and the returning test signal is impressed across terminals 412 and 414. If terminal 413 is positive with respect to terminal 415, a series DC current path is completed through a diode 433 and the solenoid of a relay 423 which has a plurality of contacts designated as SB1. A pair of SB1 contacts connects the constant current generator 426 to terminals 412 and 414 such that the terminal 412 is positive with respect to the terminal 414. Another pair of SB1 contacts connects an amplifier 442 such that its input terminals are effectively terminals 412 and 414 and its output terminals are effectively terminals 413 and 415. If, on the other hand, terminal 415 is positive with respect to terminal 413, another DC path comprising a diode 431 and the solenoid of a relay 421 is completed to activate a plurality of contacts designated as SB2 in FIG. 4. The SB2 contacts connect the constant current regulator 426 to terminals 412 and 414 so that terminal 414 is positive with respect to terminal 412 and the amplifier 442 is also connected to amplify the returning test signals. The amplifiers 441 and 442 have different gains which compensate for different path lengths of the test signals.

Although the invention is illustrated for use in a fault locate system of a digital transmission system, the principles of application of the invention may be used in many types of transmission systems. The principles of the invention can also be expanded for more than two conductors in a fault locate line in which digitalized apparatus is used to obtain further combinations by selectively powering apparatus to enable a standard test procedure to be repeated for each combination. Therefore, it is to be understood that the present invention which has been described above is illustrative of the applications of the principles of this invention. Numerous other arrangements of the testing facilities and procedures may be devised by those skilled in the art without departing from the spirit of the invention.

What is claimed is:

1. In a cable transmission system, a fault locate system comprising:

- a fault locate line having two conductors extending from a first to a second attended repeater station,
- a first and a second section of said line being joined by a crossover to reverse the polarity of the power of the conductors of said line,
- means for transmitting information between said attended repeater stations comprising a transmission network having several serially unattended repeater stations located along the transmission path,
- each of said unattended repeater stations being connected through filtering means to a fault locate amplifier connected to said line,

- a first group of said amplifiers being connected to said first section,
- a second group of said amplifiers being connected to said second section,
- each of said amplifiers being activated in response to a predetermined polarity of the power on said line,
- said attended repeater stations each having testing means connected to said network and capable of generating a group of different test signals, each one of said filtering means being individually responsive to a different test signal,
- means for detecting the group of the different returning test signals being connected to said line at the attended repeater station generating said test signals for evaluating the operation of the individual unattended repeater stations to locate a faulty repeater along said path,
- and means for reversing the polarity of the power connected to said line for selectively powering said first or second group of said amplifiers such that each of said groups can be tested individually by said testing means.

2. In a cable transmission system, the fault locate system of claim 1 further comprising a plurality of fault locate line repeater stations serially spaced along the path of said line, each of said fault locate line repeaters comprising:

- means for polarity sensing the incoming power of said line on either side of said repeaters,
- means for repowering said amplifiers connected to said line on the other side of said line repeaters with the same polarity as the incoming power,
- and said means for polarity sensing connecting amplifying means to said line to amplify said returning test signals.

3. In a cable transmission system, the fault locate system of claim 2 wherein said fault locate line repeater stations, including said amplifying means, further comprise two separate amplifiers connected to provide different amplification in opposite directions along said line, each of said amplifiers having a gain sufficient to compensate for the attenuation of said returning test signal.

4. In a cable transmission system, the fault locate system of claim 2 wherein said fault locate line repeaters, including said means for polarity sensing, further comprise a plurality of relays having a diode of a predetermined polarity connected in series with the inductor of each of said relays to provide polarity sensing means for said either side of said line repeater, and each of said relays having a plurality of contacts to connect amplifying means and powering means to amplify said returning test signal and to repower said line with the appropriate polarity of said incoming line.

5. In a cable transmission system, the fault locate system of claim 1 wherein said fault locate amplifier further comprises a first diode arrangement being reverse-biased to power said amplifier and a second diode arrangement being forward-biased to complete the series circuit of the output connection of said amplifier to said line, both arrangements being activated by a predetermined line polarity.

* * * * *